United States Patent
Laydera-Collins

(10) Patent No.: US 6,564,760 B2
(45) Date of Patent: May 20, 2003

(54) STRATIFIED SCAVENGING TWO-CYCLE INTERNAL COMBUSTION ENGINE

(76) Inventor: Imack Laydera-Collins, 1312 Bay Ridge Dr., Benton, LA (US) 71006

( * ) Notice: Subject to any disclaimer, the term of this patent is extended or adjusted under 35 U.S.C. 154(b) by 20 days.

(21) Appl. No.: 09/957,272

(22) Filed: Sep. 20, 2001

(65) Prior Publication Data

US 2003/0051684 A1 Mar. 20, 2003

(51) Int. Cl.[7] ............................................... F02B 33/04
(52) U.S. Cl. ................................................. 123/73 AA
(58) Field of Search ........................... 123/73 AA, 73 A

(56) References Cited

U.S. PATENT DOCUMENTS

| | | | |
|---|---|---|---|
| 1,121,584 A | | 12/1914 | Harper |
| 1,168,425 A | | 1/1916 | Rosenhagen |
| 1,346,066 A | | 7/1920 | Spuhler |
| 2,215,030 A | * | 9/1940 | Chastain et al. ......... 123/73 AA |
| 2,352,267 A | * | 6/1944 | Kelsey ..................... 123/25 C |
| 2,605,787 A | * | 8/1952 | Kiekhaefer ........... 123/196 CP |
| 3,257,998 A | * | 6/1966 | Brooks .................. 123/73 AA |
| 4,135,479 A | | 1/1979 | Reitz |
| 4,161,163 A | * | 7/1979 | Boyesen .................... 123/73 A |
| 4,253,433 A | | 3/1981 | Blair |
| 4,711,201 A | | 12/1987 | Ooyama |
| 4,809,648 A | | 3/1989 | Luo |
| 4,829,940 A | | 5/1989 | Okazaki |
| 4,934,345 A | * | 6/1990 | Fukuoka et al. ......... 123/73 AA |
| 4,970,769 A | * | 11/1990 | Iesato et al. ............. 123/73 AA |
| 5,379,732 A | | 1/1995 | Mavinahally |
| 6,085,703 A | | 7/2000 | Noguchi |
| 6,112,708 A | | 9/2000 | Sawada |
| 6,152,093 A | | 11/2000 | Sawada |
| 6,173,683 B1 | | 1/2001 | Nemoto |
| 6,367,432 B1 | * | 4/2002 | Araki ....................... 123/73 A |

OTHER PUBLICATIONS

An Investigation of Certain Aspects of the Two–Stroke Engine for Automoviles by Lanchester & Peasall, 1922 England.
Developments of Stratified Scavenging Systems for Small Capacity 2–Stroke Engines. JSAE 9938025 Cunningham, Kee, Kenny & Skelton SAE 1999.
An Assessment of a Stratified Scavenging Process Applied to a Loop Scavenged Two–Stroke Engine. JSAE 9938027 Ellicott, Douglas & Kenny SAE 1999.

* cited by examiner

Primary Examiner—Noah P. Kamen
Assistant Examiner—Jason Benton

(57) ABSTRACT

A compact low emission, two-cycle, crankcase scavenged, spark ignited internal combustion engine with stratified scavenging is provided. The two-cycle engine including a cylinder block containing scavenging ports and a fresh air supply port. Said scavenging ports are formed as a blind pocket inside the cylinder walls. A piston having passages for alternatively communicating the transfer ports with the fresh air intake port and with a crankcase chamber in unison with the engine. By this method, the air trapped into the piston chambers creates an air mass, which is used as a buffer to evacuate the residual gases out of the cylinder chamber. This stratified "air head" substantially reduces raw fuel losses through the exhaust port, therefore, HC emissions are greatly reduced and fuel economy is enhanced.

20 Claims, 9 Drawing Sheets

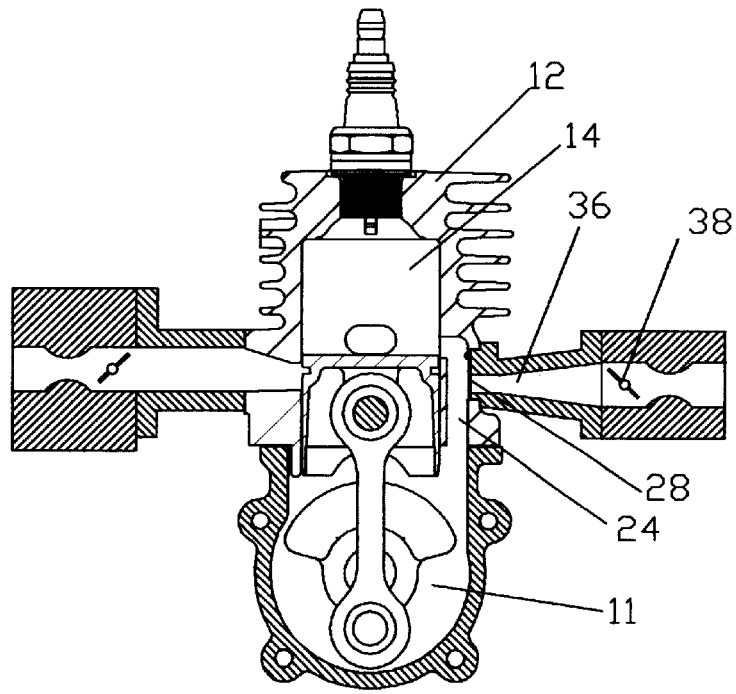
1a
(prior art)
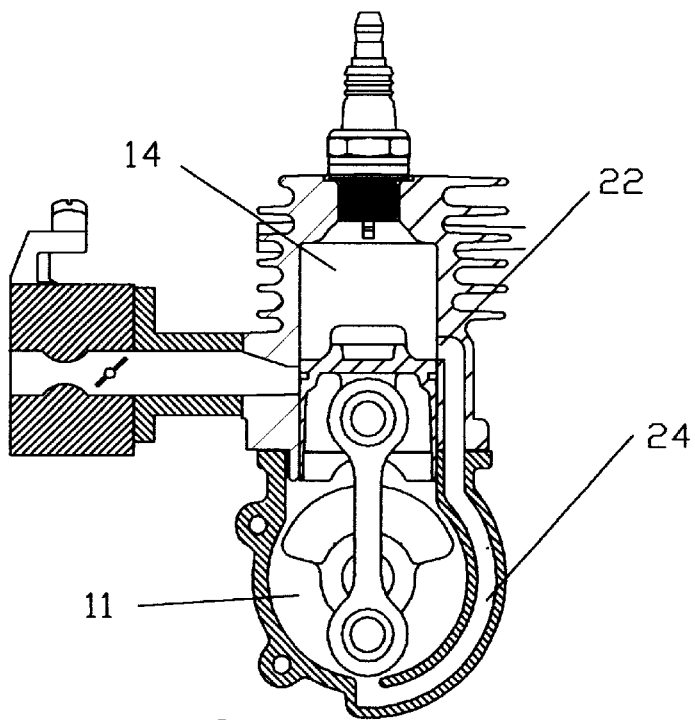
1b
Fig. 1

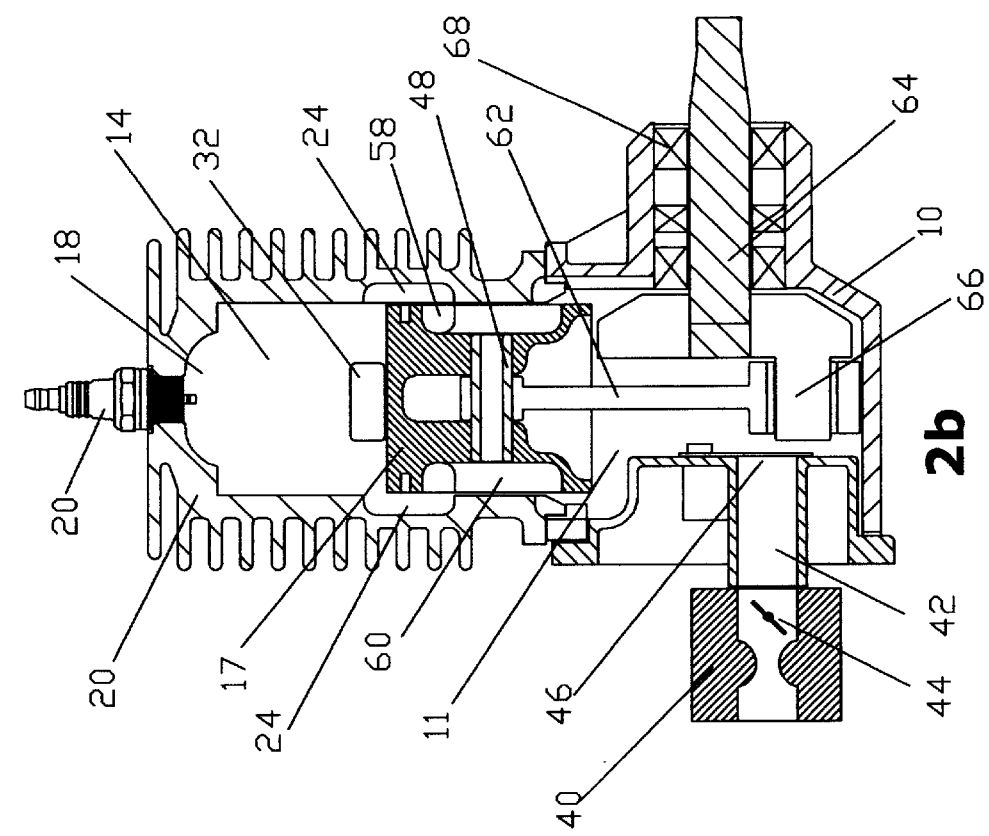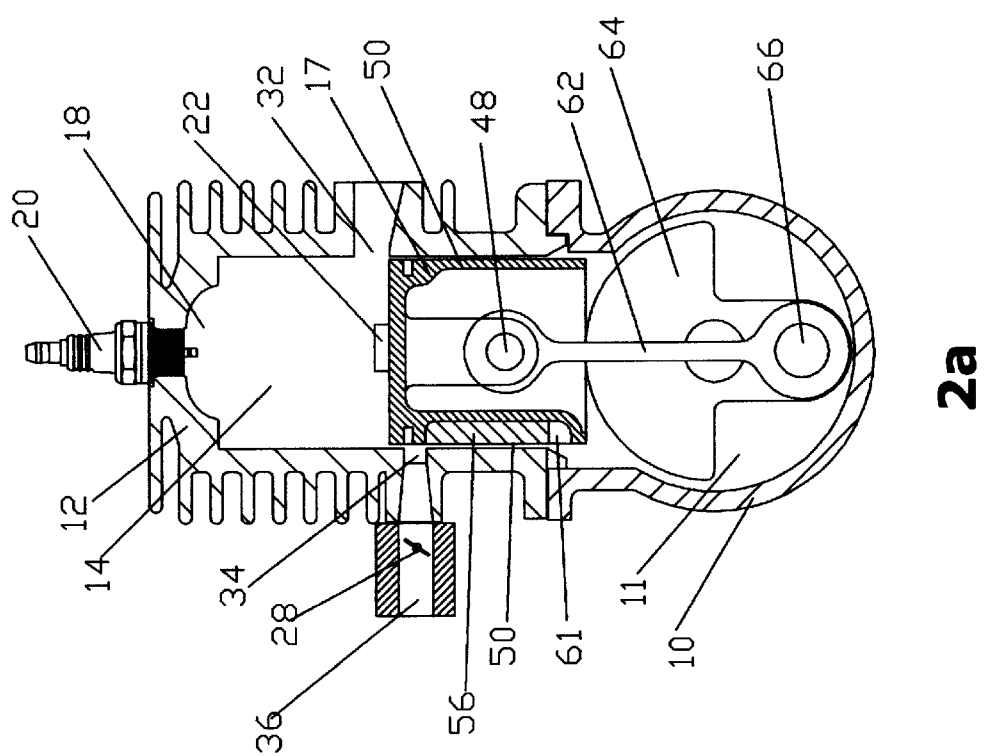
Fig. 2

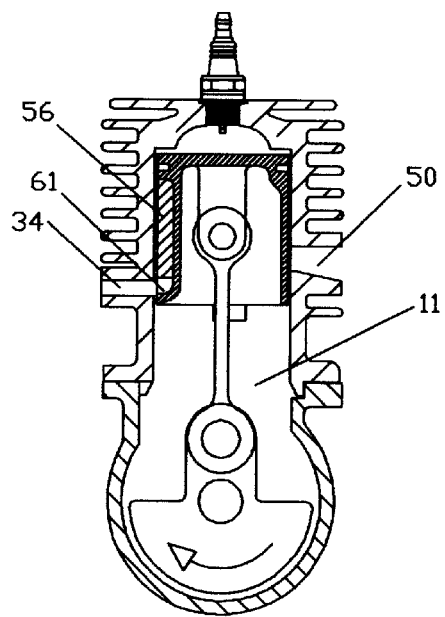
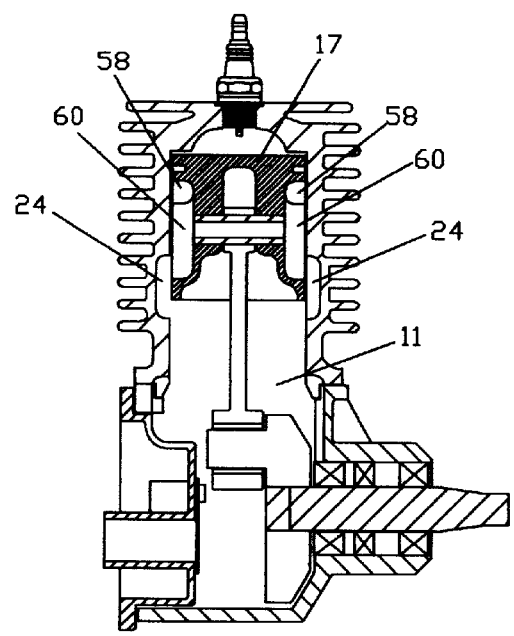
5a          5b
Fig. 5
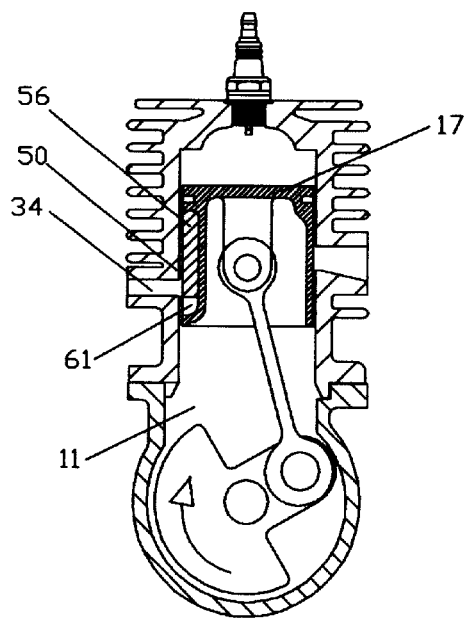
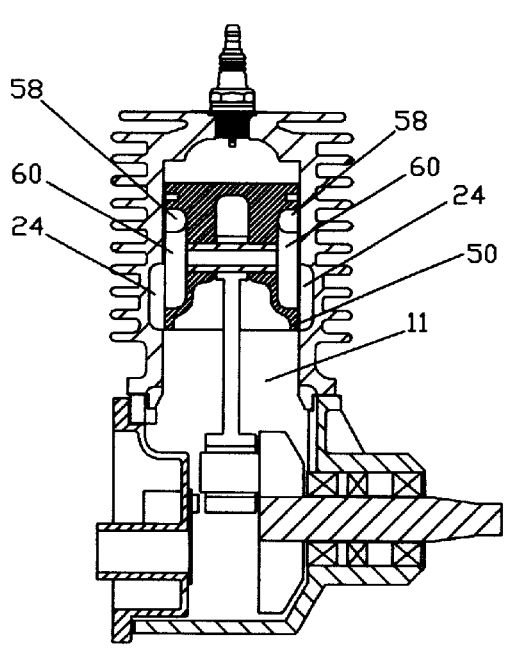
6a          6b
Fig. 6

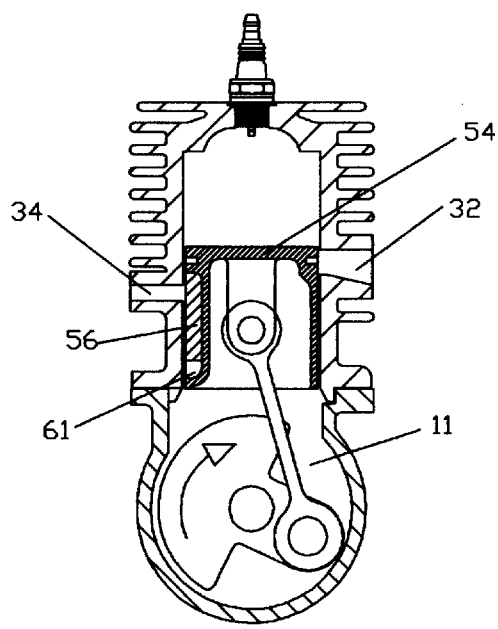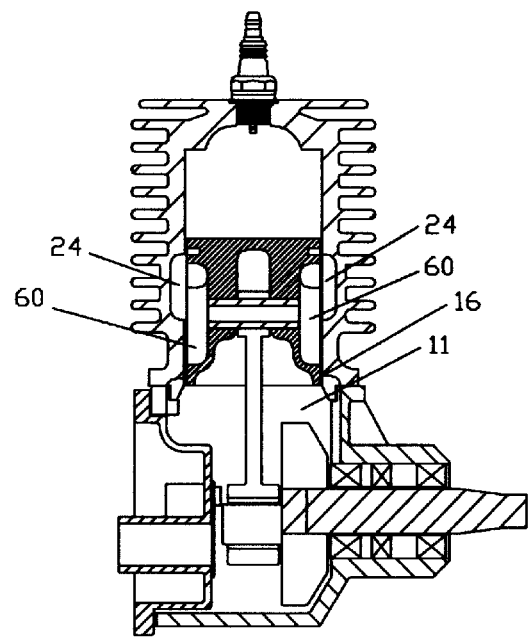
7a    Fig. 7    7b
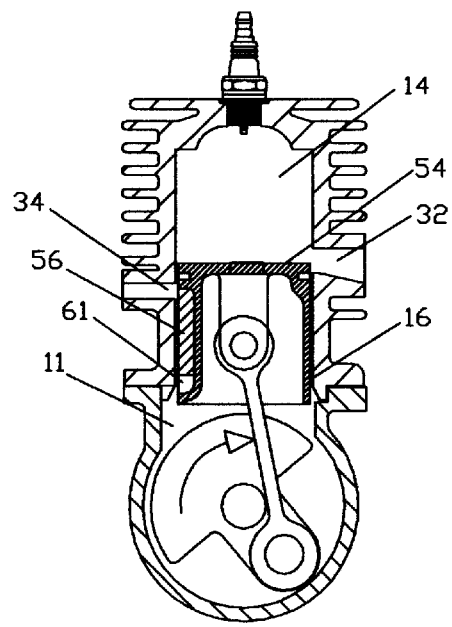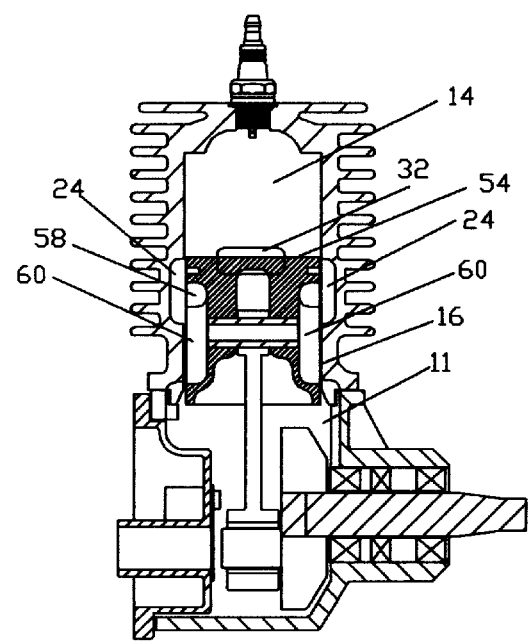
8a    Fig. 8    8b

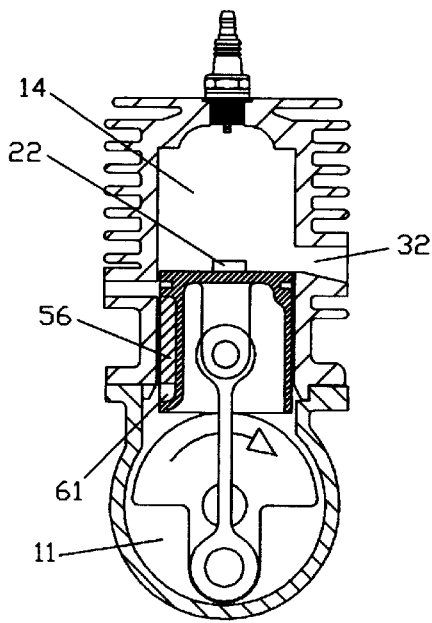
9a
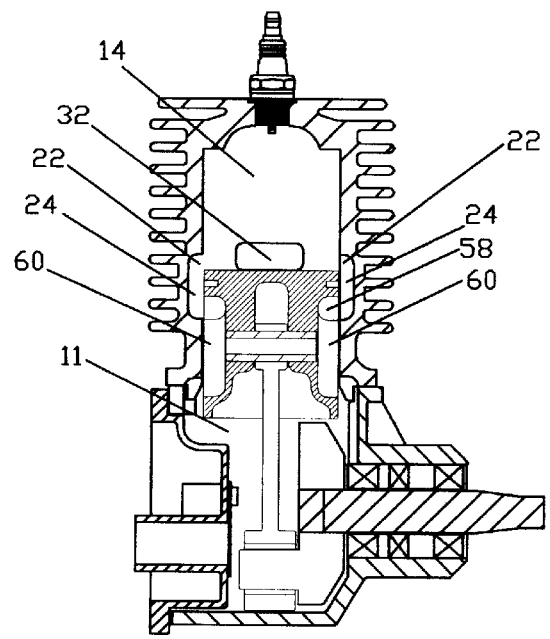
9b
Fig. 9
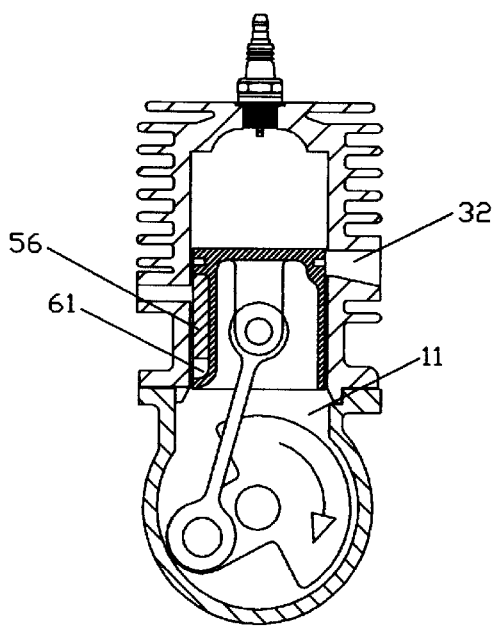
10a
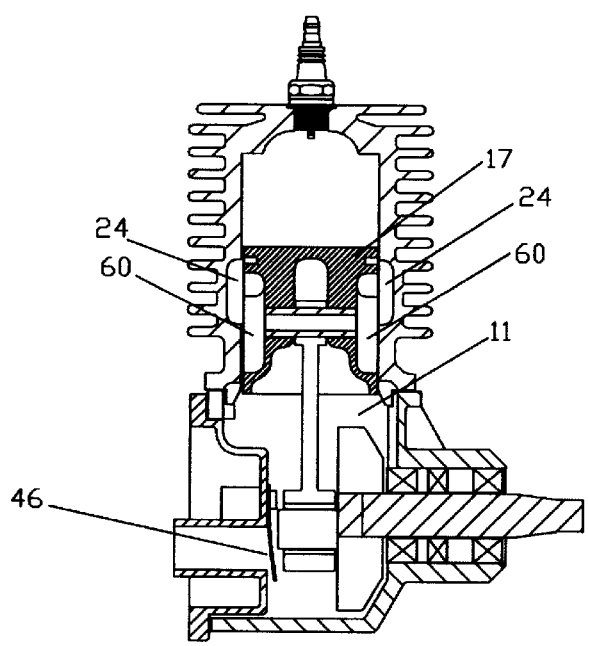
10b
Fig. 10

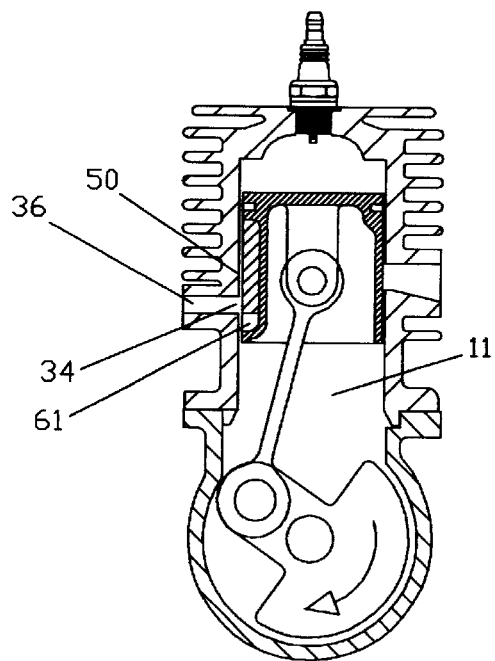
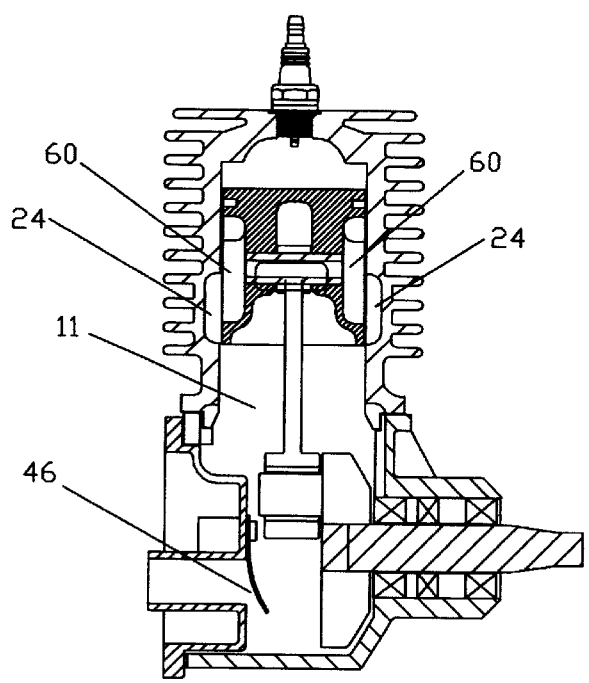
11a          11b
Fig. 11
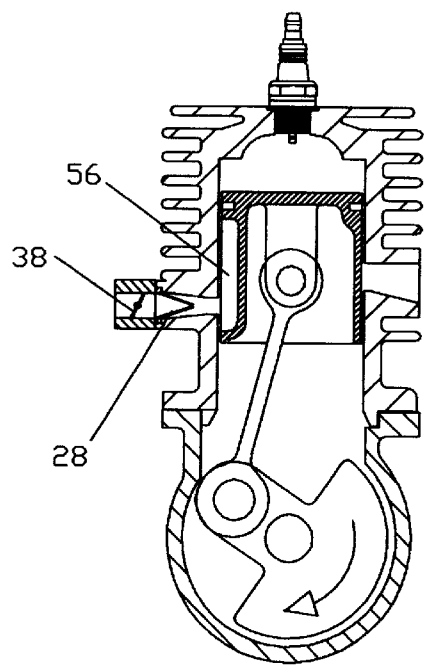
Fig. 12

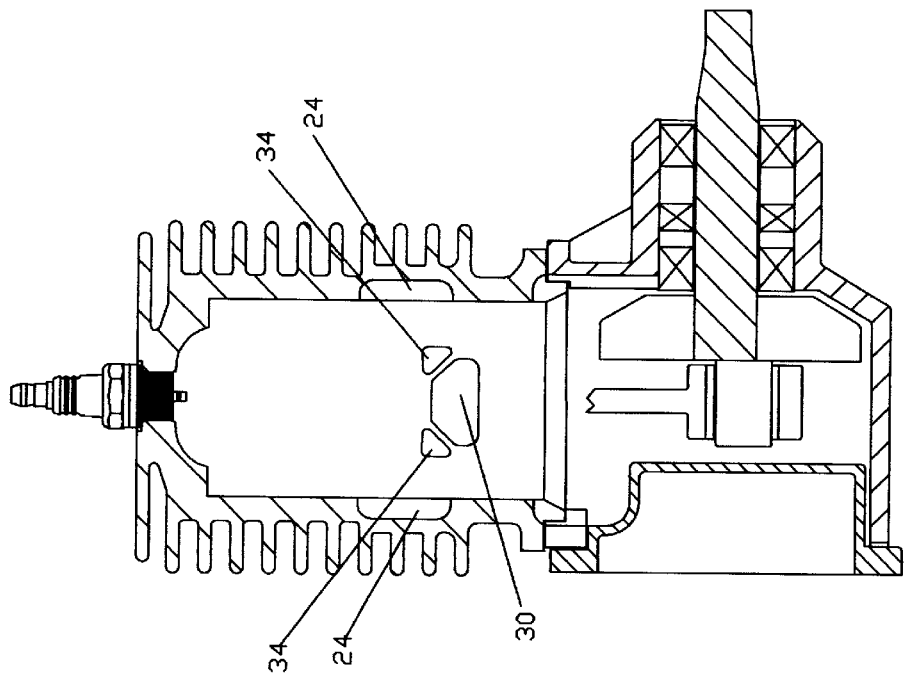
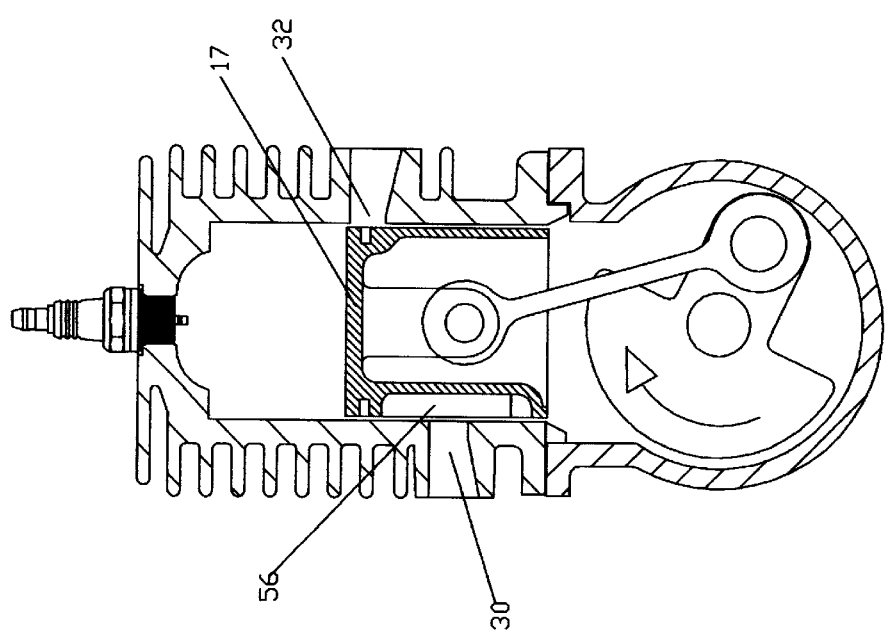
Fig. 13

STRATIFIED SCAVENGING TWO-CYCLE INTERNAL COMBUSTION ENGINE

FIELD OF THE INVENTION

The present invention pertains to a stratified scavenged, small displacement two-cycle internal combustion engine for powering portable power tools and equipment used in forestry, lawn and garden, construction and transportation.

BACKGROUND OF THE INVENTION

The two-cycle engines has been for a long time the preferred choice for powering portable tools and small high performance vehicles due to high specific power, mechanical simplicity, low maintenance and relatively low cost. The recent introduction of tougher exhaust emission regulations has forced manufacturers to develop systems that ensure complete combustion and minimization of scavenging losses.

Since the invention of the two-cycle engine in the late 1800's, the scavenging losses has been recognized as a problem, since then many solutions have been suggested in order to improve the fuel efficiency. One of these early solutions was attributed to the inventor Sir Dugald Clerk who suggested the idea of an "air head" as buffer of clean air followed by the scavenging gases to minimize the losses of combustible mixture. Following his idea, in 1911, Stephenson was granted the patent U.S. Pat. No. 1,012,288 using the "air head" principle to improve fuel efficiency in a two-cycle engine. In 1922, Lanchester and Pearsall presented an "air head" idea similar to recent developments where the air is admitted through the transfer ports. "Air heads engines", has been also called stratified scavenged engines due to the separation of the scavenging flow in two different charges: one substantially lean followed by a slightly rich fuel/air mixture.

The introductions of demanding exhaust emissions regulations all over the world has triggered the interest in the "air head" concept. Modern versions have shown substantial gains in fuel efficiency and emission reductions. It is important to recognize the work of scholars of the Queen's University in Belfast who have provided significant amount of research in this area and have published numerous technical papers.

Following two classical solutions applied to modern versions of stratified scavenging engines are illustrated by FIG. 1, showing two typical prior art stratified scavenged engines. FIG. 1a displays a simplified view of an engine as described by the U.S. Pat. No. 6,112,708 patent by Sawada. This engine works under the traditional principle of filling up with fresh air the volume of the transfer passages 24 located in both sides of the cylinder block 12, and discharging them into the cylinder chamber 14 during the scavenging cycle. The air is admitted into the transfer passages 24 through one way air valves 28 located at the top portion of the transfer passages 24 and at the end of the air intake passage 36. The airflow being controlled by an airflow control valve 38 during the induction period of the engine. At the beginning of the scavenging period, the volume of air previously admitted into the transfer passages 24 is displaced by the air/fuel mixture pressurized into the crankcase chamber 11, creating an "air head" to displace the remaining combustion gases into the cylinder chamber 14. As previously mentioned, this method was suggested by Sir Dugald Clerk in 1989, to reduce hydrocarbons losses. This style of stratified scavenged engine is costly to manufacture due to the special closed transfer ports cast into the cylinder, the required hardware required for its construction and special materials used for parts under high temperature levels such as the air intake valves.

FIG. 1b shows another style of prior art stratified scavenged engine as described in the U.S. Pat. No. 4,253,433 patent by Gordon Blair. This engine utilizes secondary transfer ports 22 to discharge a lean air/fuel mixture into the cylinder chamber 14 prior to the discharge of the main transfer ports with a slightly rich air/fuel mixture. The enleanment of the air/fuel mixture discharged through the secondary transfer ports 22 is accomplished by centrifugation, which separate the heavy fuel particles from the air/fuel mixture. This separation is accomplished by forcing a portion of the air/fuel mixture pressurized into the crankcase chamber 11 through a curved long transfer passage 24. The timing between the secondary and main transfer ports is controlled by the piston motion. As in the previous example, the lean mixture displaces the residual combustion gases into the cylinder followed by a stratified rich mixture to complete the scavenging process and fill the cylinder chamber 14 with combustible mixture. This style of engine is also costly to manufacture due to the closed transfer passages used on the cylinder and the two parts crankcase required to form the extension of the transfer passage into the crankcase. In addition to the manufacturing cost, catalysts must be added to reach the very low levels of hydrocarbon emissions required by the new government regulations.

For more than a century many other versions of stratified scavenged engines utilizing the "air head" principle, has been proposed. All these prior art engines utilize complex structures that depart from the simplicity of the traditional two-cycle engines. The present invention teaches a new "air head" design method using concepts aimed to the minimization of cost, weight and package size.

It would be obvious to the person skilled in the art, that the prior art of stratified scavenging in two-cycle engines, often has a complex construction not desirable for hand held portable tools where compactness, weight, simplicity, cost and low emissions are the dominating factors.

SUMMARY OF THE INVENTION

The object of the present invention is to provide a lightweight, compact and economical stratified scavenged two-cycle engine that offers substantial advantages over similar art such as lower weight, cost and package volume. Its simplicity and purposeful construction allows a low manufacturing cost as required in hand held gas powered tools as those used in construction, forestry, lawn and garden applications and in light transportation systems.

The two-cycle, stratified scavenged internal combustion engine object of the present invention comprises all the basic elements of typical crankcase scavenged two-cycle engine with very few modifications. The cylinder bore contains in addition to the exhaust ports, transfer ports and a combustion chamber, a fresh air supply port which is added to the cylinder wall as a mean of clean air supply. The piston is modified to allow cavities for induction, holding and ejection of the fresh air volume followed by combustible mixture.

The piston passages have two fundamental functions: to create a labyrinthine path for air to be induced through, and as a flow path for the scavenging gases from the crankcase. Air is induced into the piston passages in the proximity of the piston top dead center position (TDC), by the crankcase vacuum which pulls air through the labyrinthine passages within the piston. When the piston is in the proximity of the Bottom Dead Center position (BDC), the same point of entry of the air into the piston passages and the lateral piston chambers become in communication with the crankcase, allowing the pressurized air/fuel mixture into the crankcase to sweep the air trapped into the piston cavities or passages. By virtue of this process, the air held within the piston cavities is displaced and pushed into the cylinder transfer ports (also called scavenging ports) during the scavenging period. As a result, a blanket of air or an "air head", is used to displace the exhaust gases out of the cylinder, minimizing the escape of fuel/air mixture, therefore, reducing HC emissions.

The engine object of the present invention offers several obvious advantages over the prior art "air heads" designs: 1. There are not valves exposed to high temperature levels as those encountered at the top of the transfer passages of some prior art engines. 2. The circulation of scavenging gases through the piston walls will provide added lubrication and cooling capacity prolonging engine life. 3. Added lubrication and cooling capacity allows the engine to run at leaner settings, therefore minimizing the hydrocarbon losses. 4. The construction of air passages internal to the engine offers space savings and simplicity which will allow for lower cost and easy adaptability to existing shrouds. 5. The mechanically interrupted flow of air and scavenging gases, avoid tuning losses as found in typical prior art engines.

Due to the use of fresh air to scavenge the exhaust gasses, some of the fresh air escaping through the exhaust port as scavenging losses, mixes with the exhaust gases, which contains high levels of carbon monoxide. As a result of this chemical reaction, the excess air into the exhaust gases stream oxidizes significant amounts of carbon monoxide. The carbon monoxide is then transformed into carbon dioxide, which is a harmless gas.

The preferred embodiments of this invention have several inventive aspects, which jointly contribute to the main functional object of the invention: to reduce exhaust emissions and improving the fuel efficiency while reducing cost and weight of the engine. The invention will be better understood and further objects and advantages thereof will become more apparent from the ensuing detailed description of preferred embodiments taken in conjunction with the drawings.

BRIEF DESCRIPTION OF THE DRAWINGS

The invention and prior art will be described in closer detail in the following by means of various embodiments thereof with reference to the accompanying drawings, wherein identical numeral references have been used in the various drawing figures to indicate identical parts.

FIG. 1 shows schematic illustration of two prior-art stratified scavenged two-cycle engines.

FIG. 2 is a set of cross sectional views of the engine embodying the present invention. One sectional view is through the engine's cylinder centerline and perpendicular through the crankshaft. The other is through the crankshaft centerline and the cylinder centerline.

FIGS. 5 through 11 illustrates the sequence of operation of the engine. These illustrations use the same two cross sectional views as in FIG. 2, showing selected piston positions during the complete cycle.

FIG. 12 shows a cross sectional view of an alternate method of configuring the engine. The section is through the cylinder axis and perpendicular to the crankshaft axis.

FIG. 13 shows two cross sectional views of an alternate method of configuring the engine. The drawings illustrate the design of a piston ported intake system in combination with the novel structure of the engine object of the present invention.

Figure 3:
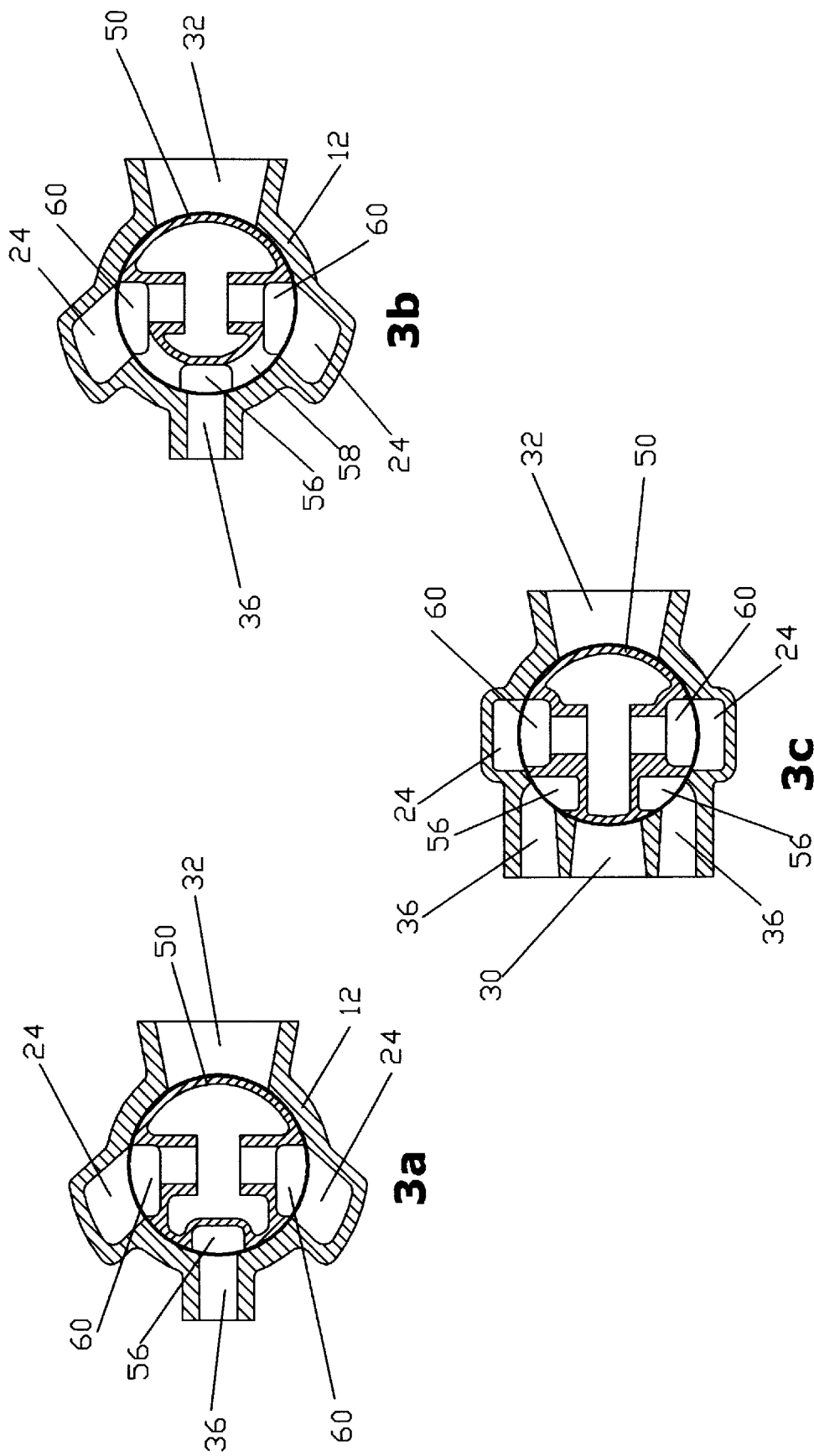
FIG. 3 is cross sectional view perpendicular to the cylinder and piston centerline to show the position of the piston passages in relation with the cylinder ports.

DETAILED DESCRIPTION OF THE PREFERRED EMBODIMENTS.

The embodiments of the present invention will now be explained with reference to the accompanying drawings. FIG. 1 previously used to describe the elements on the prior art that are common to the elements of the present invention.

Now referring to FIG. 2, the elements of the stratified scavenged two-cycle engine object of this invention, are represented in a typical crankcase scavenged two-cycle engine with reed valve induction system. Although the present invention will be described with reference to the embodiments shown in the drawings, it will be shown that the invention is not limited to a particular style of two-cycle engine and may be configured in many ways as typical two-cycle engines can be.

The engine is shown in two cross sections: FIG. 2a shows a cross section through the cylinder axis and perpendicular to the crankshaft axis. FIG. 2b shows an engine cross-section through the crankshaft axis and perpendicular to the cylinder axis. It is obvious to the skilled in the art that the engine object of the present invention share most of his elements with typical crankcase scavenged engines. Such elements are described as a cylinder block 12 including a cylinder a cylinder bore 16 and a cylinder chamber 14, a combustion chamber 18, transfer ports 22, transfer passages 24, spark plug 20 and an exhaust port 32. Cooperating with the cylinder bore 16 is a piston 17 with a special configuration which will be addressed further on. The piston 17 is fitted with a wristpin 48 for pivotally connecting the piston 17 with a connecting rod 62. The connecting rod 62 is pivotally connected to a crankshaft 64 by a crankpin 66. The crankshaft 64 is rotatively mounted over an engine block 10 by bearings 68. The engine block containing a crankcase chamber 11.

Figure 4:
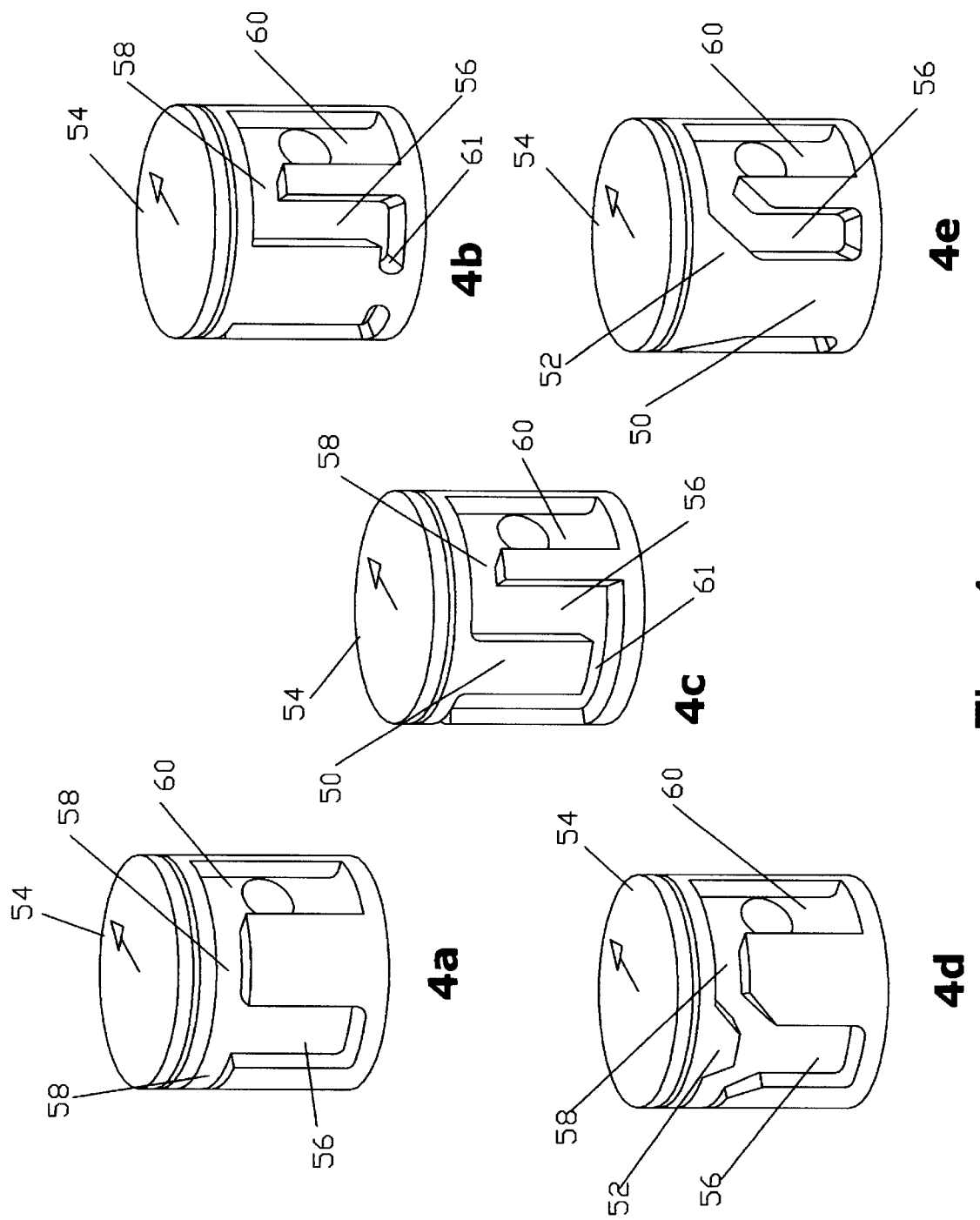
FIG. 4 displays three-dimensional representation of five style of pistons used on the alternate embodiments for the engine object of the present invention.

These aforementioned elements are identical to this found in typical crankcase scavenged two-cycle engine. Their primary function and structure are basically identical. The main differentiation and what constitutes the spirit of the present invention is the construction of key elements to allows the timely induction, holding and ejection of certain volume of air that is used to minimize hydrocarbon losses. These elements used to produce such effects are described in FIG. 2a and FIG. 2b as the fresh air intake passage 36 through the cylinder block 12 wall, the fresh air intake port 34 and the piston 17 cavities 56, 58, 60, 61. FIGS. 2, 3 and 4 show the unique special construction of the piston 17, consisting of interconnected chambers or cavities which allow the induction, holding and ejection of the volume of air that constitute the "air head". These piston cavities are better described by FIGS. 3 and 4, showing several alternate styles of construction for the piston. The different illustrations in FIG. 3 and FIG. 4 will be used as reference in association with alternate versions of the engine object of the present invention or during the description of the cycle.

For clarification, the cylinder chamber 14 is defined as the volume limited by the piston crown 54, the cylinder bore 16, the combustion chamber 18 and the spark plug 20 face. The elements of the cylinder with the function of ducting air or air/fuel mixture are described as passages, and their opening into the cylinder bore 16 or the crankcase chamber 11 is called ports. The piston cavities may be called in some instances piston passages or chambers.

FIG. 2 and FIG. 4c will be used as the main reference to describe the structure and function of the engine object of the present invention. As shown by FIG. 2, the air porting cavity 61, located in the lower portion of the piston skirt 50, allows the fluid communication between the fresh air intake port 34 and the piston vertical cavities 56. The mission of the air porting cavities 61 is to timely control the opening and closing of the fresh air intake port 34 in unison with the engine. The piston vertical cavities 56 are connected to the piston annular cavities 58 at both sides of the piston 17. The annular cavities 58 are connected at the opposite end with the piston lateral cavities 60. When air enters through the air porting cavity 61, it circulates through the vertical cavities 56, then through the annular cavities 58 and finally entering into the piston lateral cavities 60.

With the aforementioned elements the engine operation will be described based on the same engine cross sections utilized by FIG. 2 showing changes on piston position and its effects on the engine cycle. Using the illustrations provided by FIGS. 5 through 11 the stratified scavenged two-cycle engine operation can be described as follows: FIG. 5 shows the engine with the piston 17 at its top dead center position (TDC) typically at the beginning of the normal expansion cycle. At this point, air/fuel mixture has been previously introduced into the crankcase chamber 11 through an air/fuel one way valve 46 which is in fluid communication with a carburetor 40 and a flow control valve 44(shown in FIG. 2). It can be observed in FIG. 5a and FIG. 3a that the air-porting cavity 61 is positioned in front of the cylinder's fresh air intake port 34. FIG. 5b shows how the upper portion of the transfer passage 24 is in communication with the piston lateral chambers 60 and the lower portion is in communication with the crankcase chamber 11. Under these conditions the negative pressure existing into the crankcase chamber 11, is transmitted through the piston cavities 56, 58, 60, 61 up to the fresh air intake port 34. These conditions allow atmospheric air to be induced into the piston cavities 56, 58, 60, 61. Flow control devices such as air flow control valve 38, port time areas and passages cross sectional areas can provide adjustments so the amount of fresh air entering the piston cavities 56, 58, 60, 61 and the crankcase chamber 11 can be controlled. The amount of fresh air entering the piston cavities 56, 58, 60, 61, is mainly controlled by an air flow control valve 38 located inside the fresh air passages 36. The air flow control valve 38 is generally coupled to the air/fuel flow control valve 44, to control the correct air/fuel ratio into the combustion chamber 18.

FIG. 6 shows the engine expansion cycle in progress. FIG. 6b shows the piston 17 positioned so that the lower edge of the piston skirt 50 closes the bottom edge of the transfer passage 24 closing the fluid communication between the crankcase chamber 11 and the transfer passage 24. FIG. 6a shows how in the other plane of view the fresh air intake port 34 is closed by the piston skirt 50 wall at the top of the air porting cavity 61. At this stage the piston cavities 56, 58, 60, 61 are filled with air in a confined space defined by the piston cavities 56, 58, 60, 61 and the cylinder bore 16.

The following position in the engine cycle is illustrated by FIG. 7. Here the top edge of the piston crown 54 is about to start the opening of the exhaust port 32. Note that the piston cavities remain still enclosed and the lower portion of the piston lateral cavities 60 and the air porting cavity 61 is approaching the lower edge of the cylinder bore 16.

FIG. 8b shows when the upper edge of the piston crown 54 already opened the exhaust port 32 allowing the pressurized combustion gases to exit the engine. Following the edge of the piston crown 54 facing the transfer ports 22 is about to uncover the upper edge of said transfer ports 22 to open the fluid communication of the volume defined by the transfer passage 24 and the piston lateral chambers 60, with the cylinder chamber 14 and the crankcase chamber 11. At this point the scavenging period is about to be initiated. FIG. 8b also shows how the upper edge of the piston skirt 50 wall defining the lower edge of the piston lateral cavities 60 is about to be uncovered by the lower edge of the cylinder bore 16 wall. This motion will open the fluid communication of the crankcase chamber 11 with the space defined by the piston lateral cavities 60 and the transfer passages 24. FIG. 8a shows how the upper edge of the piston skirt 50 wall defining the lower portion of the air porting cavity 61 is also about to be uncovered by the lower edge of the cylinder bore 16 wall. At this stage of the cycle most of the combustion gases has been released through the exhaust port 32 and the pressure inside the cylinder chamber 14 has reached a minimum value.

At this point of the cycle as shown by FIG. 8 and FIG. 9, the piston 17 is approaching the Bottom Dead Center Position (BDC). The upper edge of the piston crown 54 will start uncovering the upper edge of the transfer ports 22, the lower edge of the piston lateral cavities 60 and the air porting cavity 61. This position of the piston 17 allows the crankcase chamber 11 to be in fluid communication with the cylinder chamber 14. As a result of these conditions the pressurized air/fuel mixture occupying the crankcase chamber 11 is forced to move through the space defined by the piston cavities 56, 58, 60, 61, the cylinder bore 16 wall and the transfer passages 24, to displace the volume of air occupying such space. As the scavenging cycle is in progress, the volume of air displaced from the piston cavities is blown through the transfer ports 22, into the cylinder chamber 14, followed by a stream of rich air/fuel mixture from the crankcase chamber 11. This first release of air volume into the cylinder chamber 14, creates an "air head" that is followed by the rich air/fuel mixture to displace the remaining unburned gases remaining and fills the cylinder chamber 14 with combustible mixture. Minimal variations on the time period to open these inlets may be performed to balance the flow through the different piston cavities 56, 58, 60, 61 and the transfer passages 24, so the evacuation of the air occupying the piston cavities may be optimized.

As typically occurs in two-cycle engines, a portion of the scavenging gases escape with the residual combustion gases. Most of the scavenging gases escaping in the engine object of the present invention are a portion of the air displaced from the piston passages thus significantly reducing the amount of hydrocarbon loses when compare with typical two-cycle engines.

FIG. 9 illustrates when the piston has reached the Bottom Dead Center position (BDC). The scavenging process is still in progress, the transfer ports 22 are fully opened, the exhaust port 32 is fully opened and the lower portion of the piston cavities 56, 58, 60, 61 are fully opened to the crankcase chamber 11. At this stage only air/fuel mixture is moving through the piston cavities and the transfer passages 24 exiting into the cylinder chamber 14 through the transfer ports 22.

After reaching the BDC position, the piston 17 propelled by the inertial forces of the engine elements, starts traveling towards the Top Dead Center (TDC) position. As shown by FIG. 10, during this ascending motion of the piston 17, the transfer ports 22, exhaust ports 32, the piston cavities 56, 58, 60, 61 are closed and filled with air/fuel mixture. The upward motion of the piston 17 creates a negative pressure into the crankcase chamber 11. This negative pressure allows the air/fuel one way valve 46 to start opening and air/fuel mixture starts entering the crankcase chamber 11.

As the piston continues its travel towards the TDC position compressing the previously admitted air/fuel mixture into the combustion chamber 18, the air/fuel one way valve 46 fully opens allowing an air/fuel mixture to fill the crankcase chamber 11. FIG. 11a illustrates the position of the piston when the communication of the air intake port 34 and the air porting cavity 61 is about to be opened as the lower edge of the piston skirt 50 facing such port starts moving upwards. FIG. 11b shows that at the same time the lower edge of the piston skirt under the piston lateral cavities 60 is about to uncover the lower edge of the transfer passages 24.

As shown by FIG. 5, the piston reaches the TDC position again completing one full cycle. The fluid communication between the crankcase chamber 11 and the piston cavities 56, 58, 60, 61 is re-established allowing air from the air intake port 34 to flow again through the piston passages displacing the air/fuel mixture previously admitted during the scavenging period. At the end of this stage, the piston cavities 56, 58, 60, 61 will be filled with fresh air again.

It can be learned by the skilled in the art that the stratified scavenged two-cycle engine object of the present invention is not limited to the embodiments shown in the drawings used to describe the engine configuration and operation. It should be understood that the present invention could be embodied in many alternate forms of embodiments. In addition, any suitable size, shape or type of elements and materials can be used without departing from the principles of the engine of the present invention.

A further embodiment of the present invention is shown by FIG. 12. The basic engine shown in FIG. 2 is provided with a one way air valve 28 inside the air intake passage 36. A piston 17 with the configuration shown in FIG. 4a, FIG. 3a and FIG. 3b, is utilized on this design. The piston shown by FIG. 4a has only one vertical cavity 56, branching in two peripheral cavities 58. This configuration allows maintaining the air intake port 34 opened to the piston vertical cavity 56 during the complete travel of the piston 17. The one way air valve 28 prevents back-flow of air/fuel mixture into the air intake passage 36.

Another alternate embodiment of the present invention constitute the use of the piston configuration shown by FIG. 4d in combination with a cylinder block as shown by FIG. 2. This method of construction allows the elimination of the one way air valve 28 described by FIG. 12. The proposed configuration allows the upper portion of the piston skirt 50 directly over the fresh air intake port 34, and under the lower ring land 52, to close the fresh air intake port during the scavenging period.

Another alternate embodiment of the present invention is shown by FIG. 13, where a piston ported air/fuel intake system is utilized instead of the reed induction system previously shown by FIG. 2. As in the typical piston ported intake system, the air/fuel intake port 30 is located in the lower area of the cylinder bore 16 wall, where the air/fuel intake port 30 interfaces with the lower edge of the piston skirt 50 to open and close the air/fuel mixture flow into the crankcase chamber 11 in unison with the engine. The positioning of the air/fuel intake port 30 leave little room to place the air intake passages 36. One of the solutions for this configuration is shown by FIG. 3c and FIG. 13 in combination with a piston as described by FIG. 4b. An air/fuel intake port 30 and two air intake ports 34 are located in the bottom section of the cylinder bore 14. The opening and closing of the air/fuel intake ports 30 is performed by the lower edge of the piston skirt 50.

The opening and closing of the air intake ports 34 may be accomplished in three different ways: One way is locating air porting cavities 61 as shown by FIG. 4a, to interface with the air intake ports 34. The air intake ports 34 are located at both sides of the air/fuel intake port 30 as shown by FIG. 13b. A second option consist in locating the air intake ports 34 in the sides of the air/fuel intake port 30 as shown by FIG. 3c, and use one way air valves 28 inside the air intake passage 36 as shown in FIG. 12. A third option consist of using the lower edge of the piston lower ring land 52 similarly as done with the piston shown by FIG. 4d. FIG. 4e shows this third solution to be use in conjunction with a piston ported air/fuel intake system.

It will be obvious to the skilled in the art that the relationship, position and configuration of the air supply port in relation with the piston air passages can be changed while maintaining the circulation pattern within the piston cavities as described by the different design variations previously shown. Furthermore, some of the cavities can be manufactured as cross-drilled passages into the piston structure where no open cavity is desirable or present interference with other ports over the piston wall. As an example, the annular cavity can successfully be replaced by a cross-drilled hole from the lateral cavity to the vertical cavity, since it is located in the upper portion of the piston and adjacent to the crown. This location allows for added cast material without significant increase in piston weight.

The circulation of the scavenging gases through the piston cavities will substantially enhance the cooling abilities of the engine and will improve the lubrication between the piston and the cylinder bore walls. This added cooling capability and lubrication capacity allows for lean setting of the engine without the risk of piston or cylinder failure. The lean setting significantly reduces the amount of unburned HC that may escape to the atmosphere.

The interrupted directional flow or air and air/fuel mixture provided by the engine object of the present invention, eliminates the high speed problems associated with tuned passage lengths encountered in prior "air head" designs and provides always a consistent amount of scavenging fresh air regardless of the dynamics phenomena's involving high speed air circulation.

It is also obvious to the skilled in the art that the stratified scavenged two-cycle engine described by the drawings can be changed in many ways without departing from the spirit of the invention. The engine object of this invention can be configured in any way as a typical crankcase scavenged two-cycle engine, while maintaining the novel stratified scavenging system object of the present invention. As such the same principles can be applied to engines with any kind of crankcase induction system used in typical two-cycle engines as reed valve induction system, rotary valve induction system, piston ported induction system or combination thereof, any crankshaft and support configuration, etc Thus, from the foregoing description it should be readily apparent that the described embodiments of the invention provide a sound method of construction of a stratified scavenged two-cycle engine with reduced noxious exhaust emissions.

Of course, the foregoing description is that of preferred embodiments of the invention and various changes and modifications may be made without departing from the spirit and scope of the invention, as defined by the appended claims.

What is claimed is:

1. A two-cycle, crankcase scavenged, spark ignited internal combustion engine with improved exhaust emissions, including:

a. a cylinder block having a cylinder bore; said cylinder bore including at least one transfer port, at least one exhaust port, a combustion chamber, at least a fresh air inlet port and an engine block connected to said cylinder block; said engine block having a crankcase chamber;

b. a piston mounted for reciprocal, linear movement within said cylinder bore; said piston pivotally connected to a crankshaft; said piston having an skirt; said piston including a plurality of interconnected cavities defining an space limited by the inside diameter of the cylinder bore and the piston skirt walls; said piston chambers defining a predetermined path for alternatively establishing the fluid communication of said crankcase chamber with said fresh air inlet port or with said combustion chamber in unison with the engine.

2. The two-cycle engine of claim 1, wherein the opening and closing of said fresh air inlet port is controlled by the motion of the piston in unison with the engine, whereby the timing of the air flow entering said piston cavities is precisely controlled.

3. The two-cycle engine of claim 1, wherein the fluid communication of said fresh air intake port with said crankcase chamber is controlled by the lower edge of the piston skirt in unison with the engine; said communication is established when said piston approaches said piston top dead center position.

4. The two-cycle engine of claim 1, wherein the fluid communication of said crankcase chamber with said combustion chamber is controlled by the lower edge of one of said piston cavities and the upper edge of said piston crown in unison with the engine; said communication is established when said piston approaches said piston bottom dead center position, whereby the timing for releasing said fresh air from said piston cavities is precisely controlled.

5. The two-cycle engine of claim 1, wherein said crankcase chamber includes at least one air/fuel mixture intake port, whereby means to introduce combustible mixture into the crankcase are provided.

6. The two-cycle engine of claim 1, wherein said fresh air inlet port includes a one way valve whereby unidirectional flow of fresh air entering the engine is controlled.

7. The two-cycle engine of claim 1, wherein the fluid communication of said piston cavities and said crankcase chamber is interrupted when the piston in the vicinity of half of the engine stroke.

8. The two-cycle engine of claim 1, wherein the fluid communication of said transfer ports and said crankcase chamber is interrupted when the piston in the vicinity of half of the engine stroke.

9. The two-cycle engine of claim 1, wherein said fresh air intake port is not in direct fluid communication with said crankcase chamber.

10. The two-cycle engine of claim 1, wherein the fresh air admitted into the engine for scavenging of the combustion gases, is confined into said piston cavities.

11. The two-cycle engine of claim 1, further including control means for the fresh air entering into said piston cavities, and control means for the air/fuel mixture entering into said crankcase chamber; said control means for fresh air entering said piston cavities and said control means for air/fuel mixture entering said crankcase chamber, being interconnected, whereby the volume of fresh air entering said piston cavities is in certain proportion with the air/fuel mixture entering said crankcase chamber.

12. A piston for a crankcase scavenged two-cycle engine comprising:

a. piston crown;

b. a piston skirt; said piston skirt surface being substantially cylindrical;

c. a plurality of interconnected cavities extending from the peripheral surface of said piston skirt towards the inner volume of said piston structure limited by the piston crown inner wall, the inner side of the cylindrical surface containing the piston outside diameter, and a plane perpendicular to the piston axis through the lowest point of the piston skirt; said cavities boundaries defined by the cylindrical plane containing the outside diameter of said piston and the piston skirt walls extending around the cross sectional shape of said cavities; said cavities in fluid communication with each other to establish a path for fluid communication between a crankcase chamber alternatively with an fresh air intake port or a combustion chamber in unison with the engine.

13. The piston for a crankcase scavenged two-cycle engine of claim 12, wherein said piston cavities alternatively allow unidirectional flow of air/fuel mixture and fresh air into a combustion chamber in unison with the engine.

14. The piston for a crankcase scavenged two-cycle engine of claim 12, wherein said piston skirt walls limiting said piston cavities, control the timing for opening the fluid communication of said crankcase chamber with said piston cavities.

15. The piston for a crankcase scavenged two-cycle engine of claim 12, wherein said piston skirt walls limiting said piston cavities are uninterrupted at the lowest point of said piston skirt, whereby a mechanical seal is provided between said piston cavities and said crankcase chamber.

16. The piston for a crankcase scavenged two-cycle engine of claim 12, wherein a portion of said piston cavities are completely or partially surrounded by metallic material used on the piston construction.

17. A method of operating a two-cycle internal combustion engine, said method comprising the steps of:

a. compressing and combusting a fresh charge within a cylinder as a piston ascend towards a top dead center position;

b. intaking fresh air/fuel mixture into the crankcase during the cylinder ascension towards the top dead center position, and filling with fresh atmospheric air interconnected piston cavities; said atmospheric air being confined to said interconnected piston cavities;

c. exhausting combustion gases from a cylinder chamber through an exhaust port controlled by the upper edge of the piston crown;

d. scavenging the remaining combustion gases from the cylinder with the volume of air contained into said interconnected piston cavities, followed by the air/fuel mixture from said crankcase chamber to fill the cylinder with combustible mixture when the piston approaches its bottom dead center position.

18. The method of claim 17, wherein the inlet point of fresh air into the piston cavities is located in the cylinder bore wall and the opening and closing of the fluid communication with said air intake port is controlled by the piston motion in unison with the engine.

19. The method of claim 17, wherein the inlet point of fresh air into the piston chambers, is located into the cylinder bore wall and includes a one way valve to control the unidirectional flow of air into the engine.

20. The method of claim 17, wherein the fluid communication between said crankcase chamber with said piston cavities is interrupted during the engine cycle.

\* \* \* \* \*